United States Patent Office 3,577,219
Patented May 4, 1971

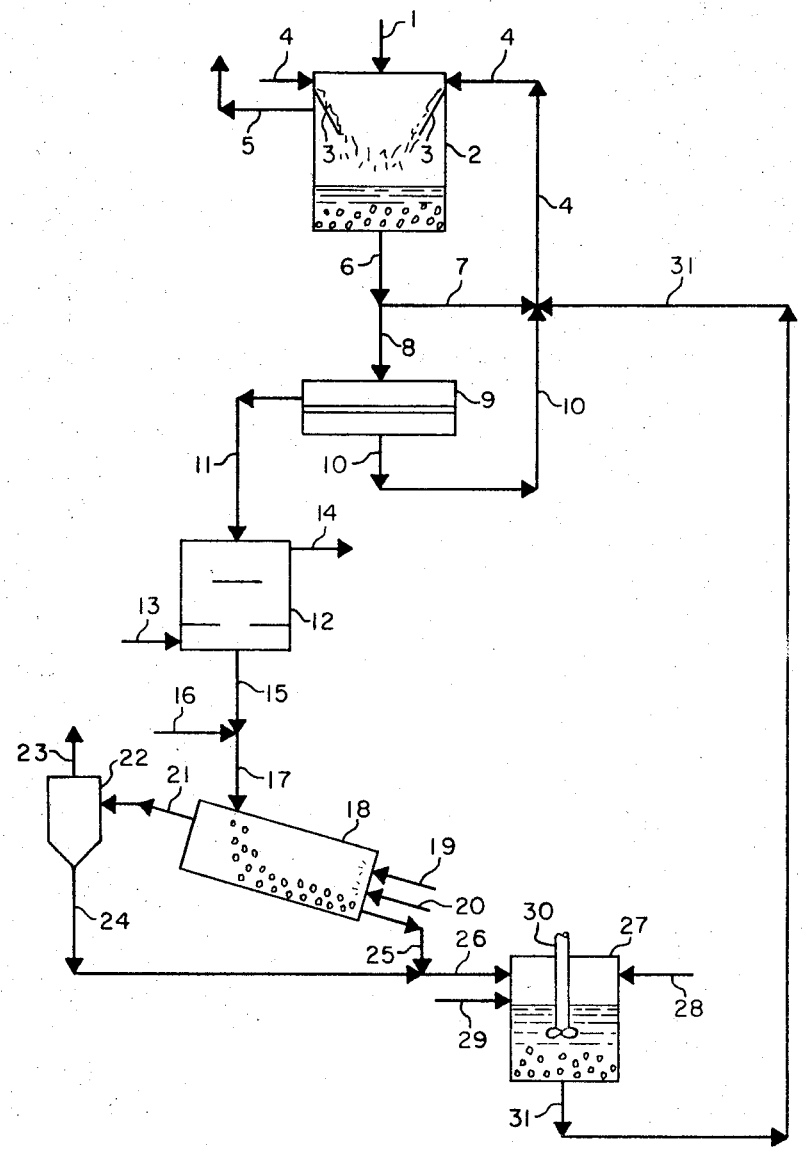

3,577,219
RECOVERY OF SULFUR DIOXIDE FROM WASTE GASES
Indravadan S. Shah, Forest Hills, N.Y., assignor to Chemical Construction Corporation, New York, N.Y.
Filed Nov. 1, 1968, Ser. No. 772,547
Int. Cl. C01b *17/72;* C01f *5/42*
U.S. Cl. 23—168
12 Claims

ABSTRACT OF THE DISCLOSURE

A process is provided to efficiently and economically absorb and recover sulfur dioxide from a waste gas stream such as the tail gas from a sulfuric acid facility, or flue gas from the combustion of a sulfur-containing fuel. The process thus eliminates air pollution, and produces a useful sulfur-containing product from the recovered sulfur dioxide. The waste gas stream is scrubbed with a recirculating aqueous slurry containing magnesium oxide and magnesium sulfite. A small quantity of magnesium sulfate may be present if formed as a result of oxidation of magnesium sulfite or absorption of sulfur trioxide.

A major portion or all of the sulfur dioxide is absorbed into the aqueous slurry, to form further magnesium sulfite. A portion of the slurry is withdrawn and processed to separate a wet solids cake from a clear liquid phase, which is added to the major recirculating slurry stream together with makeup aqueous magnesium oxide slurry. The wet solids cake is dried and calcined to yield solid magnesium oxide which is slurried with water and recycled, and a flue gas rich in sulfur dioxide, which is utilized to produce a sulfur-containing product. In case magnesium sulfate is present, carbon may be added during the calcination step, to convert magnesium sulfate to magnesium oxide and sulfur dioxide.

BACKGROUND OF THE INVENTION

Field of the invention

The invention relates to the removal and recovery of sulfur dioxide from waste gas streams, in order to prevent air pollution and to economically and efficiently recover a valuable sulfur-containing product. The invention is typically applicable to the waste flue gas generated by the combustion of a sulfur-containing fuel, such as the flue gas discharged by a coal-burning steam power plant. The invention is also applicable to the tail gas from a sulfuric acid production facility, in which case the recovered sulfur dioxide contained in the gas stream produced by calcining of the solids derived from the aqueous scrubbing slurry will generally be recycled to the sulfuric acid production facility, to produce further sulfuric acid product. The process of the present invention may also be applied to the processing of the flue gas generated by the combustion of liquor, which is produced as a by-product in the processing of wood pulp, such as the magnesia-base pulp digestion process.

Description of the prior art

At present, the flue gases leaving a power plant or sulfuric acid plant stack are a major source of air pollution due to the presence of sulfur dioxide in such flue gases. The processing of waste gas streams to remove and recover sulfur dioxide is described in U.S. Pats. Nos. 1,212,199; 2,086,379 and 2,090,142. Disclosures relative to processing involving sulfite solutions include U.S. Pats. Nos. 1,484,818; 2,210,405; 2,351,780; 2,375,786; 2,413,-321; 2,572,929; 3,085,858 and 3,273,961 and U.S. patent application No. 737,186 filed June 14, 1968. Technology relative to the processing of sulfite solutions in wood pulp manufacture is disclosed in U.S. Pats. Nos. 716,330; 830,996; 1,097,781; 1,378,617; 1,499,898; 1,549,189; 1,637,353; 1,828,690; 2,042,477; 2,042,478; 2,047,627; 2,141,886; 2,147,161; 2,147,162; 2,190,612; 2,637,627 and 2,872,289.

SUMMARY OF THE INVENTION

In the present invention, sulfur dioxide is recovered from waste gases and then regenerated in a concentrated form, so that valuable products such as liquid sulfur dioxide, sulfuric acid, elemental sulfur, etc., are produced. The process of the present invention removes up to 99% or more of the sulfur dioxide from flue gas or other waste gas by absorption in an aqueous slurry. The flue gas leaving the absorption system and discharged to the atmosphere is essentially free of sulfur dioxide, and does not cause an air pollution problem. The aqueous absorption slurry consists of an aqueous slurry containing solid magnesium oxide together with magnesium sulfite and a small proportion of magnesium sulfate. The absorption reaction takes place between magnesium oxide and sulfur dioxide to form magnesium sulfite. Some of the sulfur dioxide may concomitantly react with magnesium sulfite in the presence of water to form magnesium bisulfite, which immediately reacts with the excess of magnesium oxide to yield further magnesium sulfite, either in solution or as a precipitated solid. In any case, the absorption of sulfur dioxide ultimately results in the formation of further solid magnesium sulfite. The quantity of solid magnesium oxide in the scrubbing and absorption slurry is maintained in excess of the theoretical requirement to absorb and react with essentially all of the sulfur dioxide. In instances when a small proportion of sulfur trioxide is present in the original gas stream, the sulfur trioxide is also absorbed in the slurry and reacts to form magnesium sulfate. Additional proportions of magnesium sulfate may also form due to in situ oxidation of a portion of the magnesium sulfite, which depends on temperature and free oxygen content of the gas stream.

The resulting aqueous slurry discharged from the scrubbing step contains residual solid magnesium oxide and magnesium sulfite, and may contain magnesium sulfate, if formed as a result of oxidation of magnesium sulfite and absorption of sulfur trioxide, as well as equilibrium saturation proportions of these components dissolved in the liquid phase. In the case of magnesium oxide, the dissolved proportion will be present as magnesium hydroxide. The slurry is divided into two portions. A first portion is filtered, centrifuged or otherwise processed to separate a clear liquor phase from a wet solids cake. The clear liquor is added to the second slurry portion, and makeup aqueous magnesium oxide slurry or slaked solid magnesium oxide is also added to the second slurry portion. The resulting combined slurry is recycled for further gas scrubbing and sulfur dioxide recovery.

The wet solids cake derived from the first slurry portion is dried to remove free and bound moisture, preferably employing a direct contact drying gas under non-oxidizing conditions, to produce a dry solids cake which is then calcined generally under non-oxidizing conditions in a rotary kiln or calciner which is heated by combustion of a fluid hydrocarbon fuel. The calcined cake, now consisting essentially of solid magnesium oxide, is slaked or slurried with water and recycled as the makeup added to the second slurry portion for further gas scrubbing. The flue gas from the calciner is rich in sulfur dioxide, and is employed to produce a sulfur-containing product, such as liquid sulfur dioxide, sulfuric acid or elemental sulfur. In instances when the original gas stream subjected to scrubbing is the tail gas from a sulfuric acid plant, the flue gas from the calciner may be recycled to the sulfuric acid plant for utilization as a feed stream in sulfuric acid manufacture.

The principal advantage of the invention is that sulfur dioxide is efficiently and economically removed from waste gas streams, with removal efficiencies of up to 99% or more being attained. Thus, an air pollution problem which is present in sulfuric acid plants, steam power plants or the like may now be effectively eliminated, with the final scrubbed waste gas streams which are discharged to the atmosphere being in full compliance with air pollution regulations. In addition, sulfur dioxide is recovered in a useful and concentrated form, and may be employed to manufacture valuable sulfur-containing products. Finally, the chief raw material required for the process, namely, magnesium oxide, is regenerated and efficiently recovered by calcination, and hence the makeup fresh magnesium oxide requirement is minimum.

It is an object of the present invention to remove sulfur dioxide from waste gas streams in an improved manner.

Another object is to recover sulfur dioxide from waste gas streams in a concentrated gas stream which may be employed to manufacture valuable sulfur-containing products.

A further object is to provide a process for the substantially complete removal of sulfur dioxide from waste gas streams.

An additional object is to utilize an aqueous slurry containing solid magnesium oxide particles for the effective removal of sulfur dioxide from gas streams as solid magnesium sulfite.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. Waste gas stream 1 is derived from a chemical facility or other process facility which generates an off-gas or waste gas stream containing sulfur dioxide, which must be removed or reduced to a low concentration level before the off-gas or waste gas is discharged to atmosphere. Stream 1 is typically generated as the tail gas from a sulfuric acid plant or the combustion flue gas from a steam power plant burning a sulfur-containing fuel such as coal or residual oil, and stream 1 will typically contain in the range of about 0.1% to 0.7% sulfur dioxide content by volume. In some instances, such as when stream 1 is derived from a steam power plant, the initially generated waste gas stream will contain entrained solid particles such as fly ash, which are removed from the waste gas stream by electrostatic precipitation, scrubbing with water, or other suitable means not shown. In any case, stream 1 is passed into gas scrubbing means 2, which is preferably a venturi-type contactor provided with an internal inverted frusto-conical baffle 3. An aqueous slurry stream 4, consisting of a slurry containing dispersed solid particles of magnesium oxide, magnesium sulfite and magnesium sulfate, is passed into unit 2 above the upper edge of baffle 3 and flows downwards on baffle 3 as a thin slurry film. The waste gas stream flows downwards in unit 2 and is accelerated to high velocity by the converging side walls of baffle 3, and the thin slurry film is projected into the high velocity gas stream at the lower opening of baffle 3. The aqueous slurry is thereby rapidly and uniformly dispersed into the gas stream, with rapid attainment of gas-slurry equilibrium at a temperature typically in the range of 50° C. to 90° C., and with rapid absorption of sulfur dioxide from the gas stream into the aqueous slurry droplets. The absorbed sulfur dioxide immediately reacts with slurry components such as magnesium oxide as described supra, with the formation of further magnesium sulfite in solution and as a deposited solid component.

The resultant aqueous slurry and scrubbed waste gas stream separate in the lower part of unit 2, with scrubbed waste gas being remove from unit 2 via stream 5, which may now be devoid of sulfur dioxide, or more typically may contain a reduced proportion of about 0.01% to 0.05% sulfur dioxide content by volume. Stream 5 is now passed to a stack or other suitable disposal means for discharge to the atmosphere without causing air pollution. The resultant aqueous slurry stream 6 discharged from unit 2 is now divided into a recycle portion stream 7 and slurry stream portion 8, which is further processed in accordance with the invention. Stream 8 is passed into a suitable liquid-solids separation means 9, which consists of a filter, centrifuge or the like, and the separated clear liquid phase stream 10 produced by unit 9 is recycled to waste gas scrubbing by addition to stream 7. The solids stream 11 removed as a wet filter cake from unit 9 is now processed to recover a process gas stream rich in sulfur dioxide and regenerated magnesium oxide.

Stream 11 is passed into a suitable solids dryer 12, which may consist of a fluidized bed dryer or rotary dryer or the like in practice. A preheated hot drying gas stream 13, which may consist of flue gas, nitrogen or other suitable non-oxidizing gas stream is passed into unit 12, generally at a temperature in the range of 80° C. to 300° C., and contacts the wet solids cake to evaporate and remove water. The resulting cooled gas stream 14 containing evaporated water vapor is discharged from unit 12 to atmosphere or other suitable disposal. In most instances, stream 14 will be passed to a suitable cyclone or other device, not shown, to separate and recover entrained solid particles prior to final disposal.

The dried solids stream 15 discharged from unit 12 is now combined with solid free carbon stream 16 to form combined solids stream 17. Stream 16 may in practice consist of coal or other suitable solid carbonaceous material. Stream 16 is added to the solids stream 15 in order to aid in the reduction of magnesium sulfate contained in stream 15 to magnesium oxide and sulfur dioxide during subsequent calcination, with the concomitant formation of carbon dioxide. Stream 17 is now passed into calciner 18 which may in practice consist of a rotary kiln, fluid bed reactor, or other suitable apparatus for high temperature calcination of stream 17. Fluid hydrocarbon fuel stream 19 is burned with combustion air stream 20 within rotary kiln calciner 18, and an elevated temperature typically in the range of 400° C. to 900° C. is thereby generated within unit 18. The solids feed stream 17 is thus calcined within unit 18 under non-oxidizing conditions, with resultant decomposition of magnesium sulfite and magnesium sulfate to form solid magnesium oxide and gaseous sulfur dioxide. The sulfur dioxide combines with the flue gas generated within unit 18 by the combustion of stream 19, to yield a flue gas rich in sulfur dioxide. The resultant flue gas stream 21 removed from unit 18 now contains generally above 5% sulfur dioxide content by volume, and typically in the range of about 10% to 30% sulfur dioxide content by volume.

Sulfur dioxide-rich flue gas stream 21 is now passed into gas-solids separator 22 for the separation of entrained solid magnesium oxide particles from the gas stream. Unit 22 is any suitable apparatus for separating entrained solids from a gas stream, such as a baffled or cyclonic unit. The solids-free flue gas stream 23 discharged from unit 22 is now passed to a suitable process utilization to recover sulfur dioxide content as a valuable sulfur-containing product. In instances when stream 1 is derived as the tail gas from a sulfuric acid production facility, stream 23 may be recycled to this facility to produce further sulfuric acid from the contained sulfur dioxide. In other instances, stream 23 may be cooled to selectively condense liquid sulfur dioxide as a product, or stream 23 may be processed with a suitable reducing gas or other reducing medium by known methods to produce elemental sulfur as a product.

The solid magnesium oxide particles separated from the flue gas in unit 22 are removed via stream 24, which is combined with the major magnesium oxide stream 25 removed from unit 18 to form combined magnesium oxide stream 26, which is passed into slaker 27. The regenerated magnesium oxide stream 26 is now slaked with water in unit 27 to provide suitable magnesium oxide for recycle to the scrubbing slurry. Additional makeup magnesium oxide stream 28 may also be passed into unit 27. Water stream 29 is passed into unit 27 for slaking purposes, and in most cases sufficient water will be added via stream 29 to form a magnesium oxide slurry within unit 27, which is provided with a suitable internal stirrer or agitator 30, which in most cases merely consists of a slowly rotating paddle. The resulting aqueous magnesium oxide slurry or hydrated magnesium oxide cake formed in unit 27 is recycled to waste gas scrubbing via stream 31, which is added to stream 7 together with stream 10 to form aqueous scrubbing slurry stream 4, which is utilized as described supra.

Numerous alternatives within the scope of the invention, besides those mentioned supra, will occur to those skilled in the art. The ranges of process variables enumerated supra, such as ranges of concentration or temperature, constitute preferred embodiments of the invention for optimum utilization of the process concepts, and the invention may be practiced outside of these ranges in suitable instances. Stream 16 may be separately introduced into unit 18, instead of or in addition to adding solid carbonaceous material to stream 15. Unit 18 may alternatively be heated by electric resistor heating elements or the like, in which case stream 21 will contain a substantially higher concentration of sulfur dioxide, up to the range of about 50% to 90% by volume or higher. Unit 2 may in practice consist of any suitable device or apparatus for contacting a gas stream with a liquid slurry, and in some cases unit 2 may consist of two or more units in series, with countercurrent flow of waste gas and aqueous slurry through the units. Both the drying in unit 12 and the calcining in unit 18 may be accomplished by indirect heating. The magnesium sulfate component may not be present in some instances. If magnesium sulfate is absent, then no solid carbon will be required, and the calcination temperature may be in the range of 425° C. to 825° C. The drying and calcining may be carried out in practice in one item of equipment having two separate compartments. Heat may be recovered from the gases leaving the drier and calciner. This heat may be used to preheat combustion air, or to heat the scrubbed waste gas stream leaving the absorption system, prior to discharge. Finally, the flue gases entering the absorption system can be employed for drying purposes in unit 12.

An example of application of the process of the present invention to a typical waste gas stream will now be described.

EXAMPLE

Following is data relative to application of the process of the invention to an actual industrial waste gas stream.

| Stream No. | Temp., °C. | Flow rate | Sulfur dioxide content, vol. percent |
|---|---|---|---|
| 1 | 84 | 1,273 std. cubic meters/min | 0.5 |
| 4 | 31 | 6,820 liters/min | |
| 5 | 31 | 1,360 std. cubic meters/min | (¹) |
| 11 | 31 | 63.5 kg./min | |
| 13 | 315 | 63.5 kg./min | |
| 14 | 200 | 95.2 kg./min | |
| 15 | | 29.4 kg./min | |
| 16 | | 0.11 kg./min | |
| 19 | | 2.26 kg./min | |
| 20 | | 36.2 kg./min | |
| 23 | 900 | 54.5 kg./min | 17 |
| 26 | | 12.7 kg./min | |
| 28 | | 0.14 kg./min | |
| 29 | | 70.7 kg./min | |
| 31 | 90 | 83.6 kg./min | |

¹ Below 0.05.

NOTES:
Stream 11 contained (by weight percent).—85% magnesium sulfite hexahydrate; 5% magnesium sulfate heptahydrate; 5% magnesium oxide; 5% free water.
Stream 15 contained (by weight percent).—9.7% magnesium oxide; 85.5% magnesium sulfite; 4.8% magnesium sulfate.

What is claimed is:

1. A process for the recovery of sulfur dioxide from a waste gas stream containing sulfur dioxide which comprises scrubbing said waste gas stream with an aqueous slurry containing solid and dissolved magnesium oxide in excess of the theoretical requirement to absorb and react with essentially all of the sulfur dioxide, and solid and dissolved magnesium sulfite, whereby sulfur dioxide is absorbed into said aqueous slurry to form further solid magnesium sulfite; dividing the resulting aqueous slurry into a first portion and a second portion; separating said first slurry portion into a clear liquid phase and residual wet solids; adding said clear liquid phase and a makeup aqueous magnesium oxide slurry to said second slurry portion to form a combined aqueous slurry; recycling said combined aqueous slurry for further scrubbing of said waste gas stream; drying said residual wet solids, to form a substantially anhydrous solids stream containing solid magnesium sulfite and magnesium oxide; calcining said anhydrous solids stream at elevated temperature, to regenerate solid magnesium oxide and form a flue gas stream of high sulfur dioxide content; adding water to said regenerated solid magnesium oxide, to form said makeup aqueous magnesium oxide slurry; and processing said flue gas stream to recover a sulfur-containing product.

2. The process of claim 1, in which said waste gas stream is the tail gas from a sulfuric acid plant, and said flue gas is passed to said sulfuric acid plant for the conversion of contained sulfur dioxide to sulfuric acid.

3. The process of claim 1, in which said waste gas stream is a flue gas derived from the combustion of a sulfur-containing fuel.

4. The process of claim 1, in which said residual wet solids are dried by direct contact with a preheated nonoxidizing gas stream at a temperature in the range of 80° C. to 300° C.

5. The process of claim 1, in which said waste gas stream contains in the range of about 0.1% to 0.7% sulfur dioxide content by volume, the resulting scrubbed waste gas stream contains in the range of about 0.01% to 0.05% sulfur dioxide content by volume, and said flue gas stream contains in the range of about 10% to 30% sulfur dioxide content by volume.

6. The process of claim 1, in which said waste gas stream is scrubbed with said aqueous slurry at a temperature in the range of 50° C. to 90° C. and said anhydrous solids stream is calcined at a temperature in the range of 425° C. to 825° C.

7. A process for the recovery of sulfur dioxide from a waste gas stream containing sulfur dioxide which comprises scrubbing said waste gas stream with an aqueous slurry containing solid and dissolved magnesium oxide in excess of the theoretical requirement to absorb and react with essentially all of the sulfur dioxide, solid and dissolved magnesium sulfite, and solid and dissolved magnesium sulfate, whereby sulfur dioxide is absorbed into said aqueous slurry to form further solid magnesium sulfite; dividing the resulting aqueous slurry into a first portion and a second portion; separating said first slurry portion into a clear liquid phase and residual wet solids; adding said clear liquid phase and a makeup aqueous magnesium oxide slurry to said second slurry portion to form a combined aqueous slurry; recycling said combined aqueous slurry for further scrubbing of said waste gas stream; drying said residual wet solids by direct contact with a hot drying gas stream, to form a substantially anhydrous solids stream containing solid magnesium sulfite, solid magnesium sulfate and magnesium oxide; calcining said anhydrous solids stream together with solid carbonaceous material at elevated temperature, to regenerate solid magnesium oxide and form a flue gas stream of high sulfur dioxide content; adding water to said regenerated solid magnesium oxide, to form said makeup aqueous magnesium oxide slurry; and processing said flue gas stream to recover a sulfur-containing product.

8. The process of claim 7, in which said waste gas stream is the tail gas from a sulfuric acid plant, and said flue gas is passed to said sulfuric acid plant for the conversion of contained sulfur dioxide to sulfuric acid.

9. The process of claim 7, in which said waste gas stream is a flue gas derived from the combination of a sulfur-containing fuel.

10. The process of claim 7, in which said hot drying gas stream is a preheated non-oxidizing gas.

11. The process of claim 7, in which said waste gas stream contains in the range of about 0.1% to 0.7% sulfur dioxide content by volume, the resulting scrubbed waste gas stream contains in the range of about 0.01% to 0.05% sulfur dioxide content by volume, and said flue gas stream contains in the range of about 10% to 30% sulfur dioxide content by volume.

12. The process of claim 7, in which said waste gas stream is scrubbed with said aqueous slurry at a temperature in the range of 50° C. to 90° C., said residual wet solids are dried by contact with said hot drying gas stream at a temperature in the range of 80° C. to 300° C., and said anhydrous solids stream is calcined at a temperature in the range of 400° C. to 900° C.

References Cited

UNITED STATES PATENTS

| | | | |
|---|---|---|---|
| 1,192,640 | 7/1916 | Jardine | 23—130 |
| 2,230,592 | 2/1941 | Griessbach | 23—177 |
| 2,161,056 | 6/1939 | Johnstone et al. | 23—178S |
| 2,922,735 | 1/1960 | Johnstone | 23—178X |
| 3,273,961 | 9/1966 | Rogers et al. | 23—131 |
| 3,428,420 | 2/1969 | Douglas et al. | 23—132 |
| 3,475,121 | 10/1969 | Thornton | 23—178 |

OSCAR R. VERTIZ, Primary Examiner

C. B. RODMAN, Assistant Examiner

U.S. Cl. X.R.

23—178, 2, 129